United States Patent
Hisa

(10) Patent No.: US 9,392,181 B2
(45) Date of Patent: Jul. 12, 2016

(54) IMAGE CAPTURE APPARATUS AND METHOD OF CONTROLLING THE SAME

(71) Applicant: CANON KABUSHIKI KAISHA, Tokyo (JP)

(72) Inventor: Kenzo Hisa, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 41 days.

(21) Appl. No.: 13/951,653

(22) Filed: Jul. 26, 2013

(65) Prior Publication Data

US 2014/0055666 A1 Feb. 27, 2014

(30) Foreign Application Priority Data

Aug. 24, 2012 (JP) ................................ 2012-185766

(51) Int. Cl.
*H04N 5/235* (2006.01)

(52) U.S. Cl.
CPC .................................. *H04N 5/2351* (2013.01)

(58) Field of Classification Search
CPC ..... H04N 5/235; H04N 5/351; H04N 5/2351; H04N 5/2354; H04N 5/2355
USPC .................................. 348/362, 363, 364, 365
See application file for complete search history.

(56) References Cited

U.S. PATENT DOCUMENTS

| | | | | |
|---|---|---|---|---|
| 6,901,218 | B2 * | 5/2005 | Osawa | 396/234 |
| 7,876,367 | B2 * | 1/2011 | Muramatsu | 348/229.1 |
| 8,195,041 | B2 * | 6/2012 | Ueno | G03B 7/08 |
| | | | | 348/364 |
| 8,670,044 | B2 * | 3/2014 | Takeuchi | 348/230.1 |
| 2011/0128435 | A1 * | 6/2011 | Ikeda | 348/362 |

FOREIGN PATENT DOCUMENTS

JP 2002-118787 A 4/2002

* cited by examiner

*Primary Examiner* — Twyler Haskins
*Assistant Examiner* — Padma Haliyur
(74) *Attorney, Agent, or Firm* — Cowan, Liebowitz & Latman, P.C.

(57) ABSTRACT

An image capture apparatus comprises an image capturing unit that captures an object image and outputs image data; a photometric value acquisition unit that acquires, from the image data, a first photometric value and a second photometric value different from the first photometric value; and an exposure change unit that changes exposure such that the first photometric value comes close to a target value, wherein the exposure change unit calculates a third photometric value based on the first photometric value, the target value, and the second photometric value and corrects the exposure in accordance with a difference between the third photometric value and a reference value.

12 Claims, 4 Drawing Sheets

F I G. 1
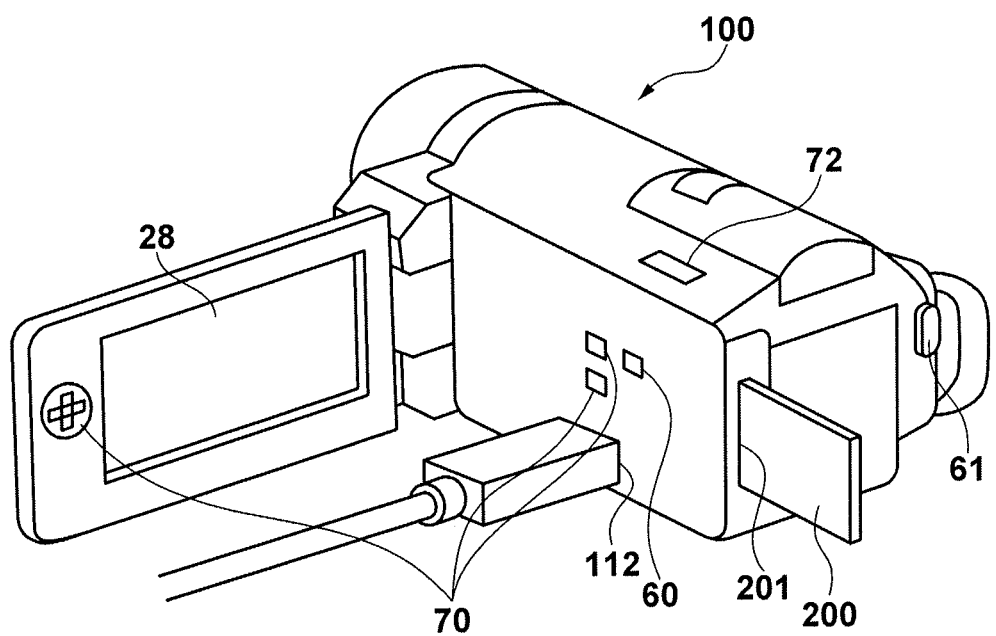

F I G. 4
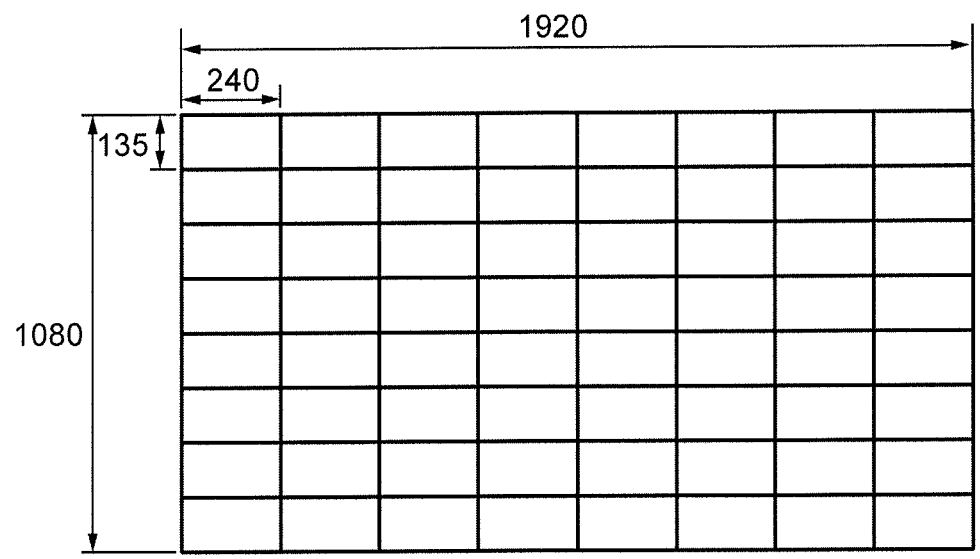
F I G. 5
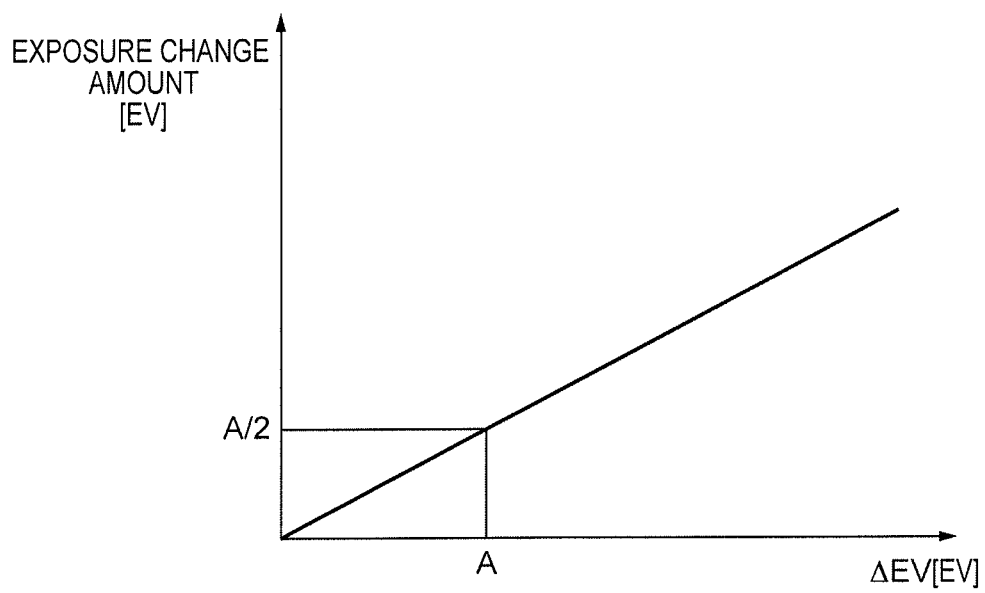

IMAGE CAPTURE APPARATUS AND METHOD OF CONTROLLING THE SAME

BACKGROUND OF THE INVENTION

1. Field of the Invention

The present invention relates to exposure control at the time of movie capturing and, more particularly, to exposure control when correcting exposure based on a photometric value.

2. Description of the Related Art

Many digital video cameras have a function of automatically controlling exposure. As an example of the method, a photometric value is acquired from image data, and the aperture, shutter speed, gain, and the like are controlled such that the photometric value reaches a target value equal to a photometric value in correct exposure which is stored in advance. The photometric value is, for example, the average luminance value of the pixels of the whole screen, and serves as the index of brightness of image data.

There are proposed various methods for generating the photometric value. For example, the whole screen is divided into the central portion and the other portion. The average luminance value of pixels of each portion is acquired. A weighted average value is calculated by adding a weight to the value of the central portion. For example, the exposure is controlled such that a value obtained by doubling the photometric values of the pixels of the central portion, adding the photometric values of the pixels of the portion other than the central portion, and dividing the sum by 3 becomes a correct value. In this method, when the main object exists at the central portion, excellent exposure can be obtained for the main object at the central portion.

Japanese Patent Laid-Open No. 2002-118787 proposes a method of obtaining information of a high luminance area in a screen and correcting an exposure control target value while controlling exposure using the photometric value as described above. Since this method suppresses the high luminance area from becoming too bright by lowering the exposure control target value, excellent exposure can be obtained for the main object even when it exists in the high luminance area of the screen.

However, in Japanese Patent Laid-Open No. 2002-118787, the exposure control target value is determined based on the number of areas indicating luminance levels equal to or higher than a predetermined level out of a plurality of areas. The number of areas indicating luminance levels equal to or higher than the predetermined level increases/decreases in accordance with a change of the exposure control target value. Hence, the exposure control target value may be unstable, and it may be impossible to perform excellent exposure control.

SUMMARY OF THE INVENTION

The present invention has been made in consideration of the above-described problem, and makes it possible to perform excellent exposure control when correcting exposure based on a photometric value.

According to the first aspect of the present invention, there is provided an image capture apparatus comprising: an image capturing unit that captures an object image and outputs image data; a photometric value acquisition unit that acquires, from the image data, a first photometric value and a second photometric value different from the first photometric value; and an exposure change unit that changes exposure such that the first photometric value comes close to a target value, wherein the exposure change unit calculates a third photometric value based on the first photometric value, the target value, and the second photometric value and corrects the exposure in accordance with a difference between the third photometric value and a reference value.

According to the second aspect of the present invention, there is provided an image capture apparatus comprising: an image capturing unit that continuously performs a plurality of image capture processes and acquires a plurality of image data; a photometric value acquisition unit that acquires a first photometric value based on photometric results of a plurality of divided photometric areas and a second photometric value based on the photometric result of a high luminance area out of the plurality of photometric areas, the second photometric value being different from the first photometric value; and an exposure change unit that changes exposure such that the first photometric value comes close to a target value during a period in which the plurality of image capturing processes are continuously performed, wherein the exposure change unit corrects the exposure based on the first photometric value, the target value, and the second photometric value.

According to the third aspect of the present invention, there is provided a method of controlling an image capture apparatus including an image capturing unit that captures an object image and outputs image data, comprising: a photometric value acquisition step of acquiring, from the image data, a first photometric value and a second photometric value different from the first photometric value; and an exposure change step of changing exposure such that the first photometric value comes close to a target value, wherein in the exposure change step, a third photometric value is calculated based on the first photometric value, the target value, and the second photometric value, the exposure is corrected in accordance with a difference between the third photometric value and a reference value.

According to the fourth aspect of the present invention, there is provided a method of controlling an image capture apparatus including an image capturing unit that continuously performs a plurality of image capture processes and acquires a plurality of image data, comprising: a photometric value acquisition step of acquiring a first photometric value based on photometric results of a plurality of divided photometric areas and a second photometric value based on the photometric result of a high luminance area out of the plurality of photometric areas, the second photometric value being different from the first photometric value; and an exposure change step of changing exposure such that the first photometric value comes close to a target value during a period in which the plurality of image capturing processes are continuously performed, wherein in the exposure change step, the exposure is corrected based on the first photometric value, the target value, and the second photometric value.

Further features of the present invention will become apparent from the following description of exemplary embodiments with reference to the attached drawings.

BRIEF DESCRIPTION OF THE DRAWINGS

FIG. 1 is a perspective view showing the outer appearance of a digital video camera serving as an image capture apparatus according to the first embodiment of the present invention;

FIG. 4 is a view showing an example of a photometric value acquisition area; and FIG. 5 is a graph showing the relationship between the exposure change amount and ΔEV for exposure change amount calculation.

DESCRIPTION OF THE EMBODIMENTS

Figure 2:
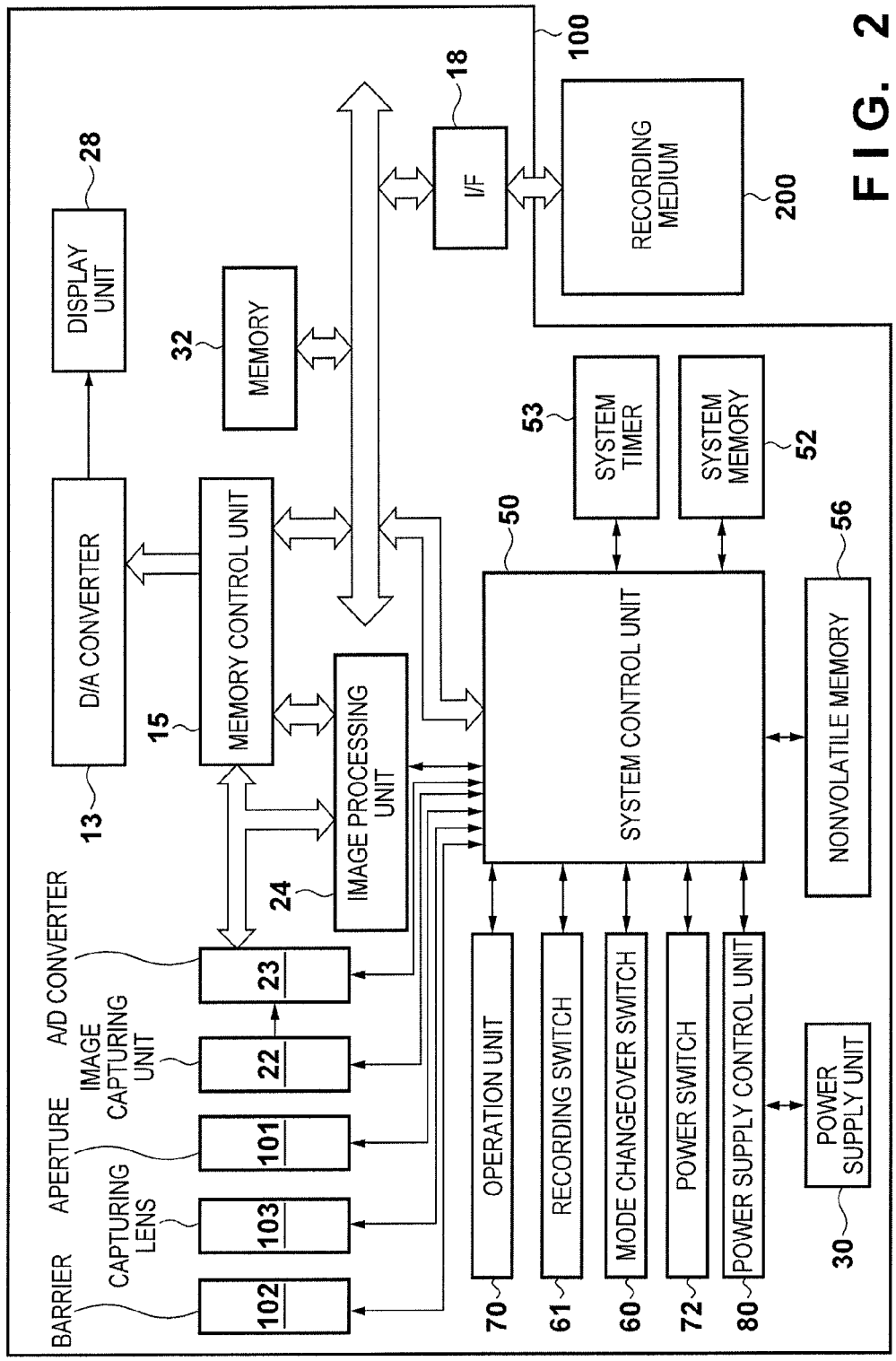
FIG. 2 is a block diagram showing the internal arrangement of the digital video camera.

The embodiments of the present invention will now be described in detail with reference to the accompanying drawings.

First Embodiment

FIG. 1 is a perspective view showing the outer appearance of a digital video camera 100 serving as an image capture apparatus according to the first embodiment of the present invention. Referring to FIG. 1, a display unit 28 displays images or various kinds of information. A recording switch 61 is an operation unit used to input an image capturing instruction. A mode changeover switch 60 is an operation unit used to variously change the mode. A connector 112 connects an external device and the digital video camera 100. An operation unit 70 includes operation members such as various kinds of buttons and a 4-way selector, which accept various kinds of operations from the user. A power switch 72 powers on/off the digital video camera. A recording medium 200 is formed from a memory card, a hard disk, or the like. A recording medium slot 201 stores the recording medium 200. The recording medium 200 stored in the recording medium slot 201 can communicate with the digital video camera 100.

FIG. 2 is a block diagram showing the internal arrangement of the digital video camera 100 according to this embodiment. Referring to FIG. 2, an image capturing lens 103 includes a zoom lens and a focus lens. An aperture 101 is used to adjust the light amount. An image capturing unit 22 is an image sensor that is formed from a CCD or CMOS element and captures an object image by converting an optical image into an electrical signal. An A/D converter 23 converts an analog signal into a digital signal. The A/D converter 23 is used to convert an analog signal output from the image capturing unit 22 into a digital signal. A barrier 102 covers the image capturing lens 103 of the digital video camera 100, thereby preventing the image capturing system including the image capturing lens 103, the aperture 101, and the image capturing unit 22 from becoming dirty or damaged.

An image processing unit 24 performs predetermined resize processing such as pixel interpolation or reduction and color conversion processing for data from the A/D converter 23 or data from a memory control unit 15. The image processing unit 24 also performs predetermined arithmetic processing using captured image data. A system control unit 50 performs exposure control and focus control based on the obtained arithmetic result. AF (Auto Focus) processing and AE (Auto Exposure) processing of the TTL (Through The Lens) system are thus performed. The image processing unit 24 also performs predetermined arithmetic processing using captured image data, and AWB (Auto White Balance) processing of the TTL system is also performed based on the obtained arithmetic result.

The output data from the A/D converter 23 is directly written in a memory 32 via the image processing unit 24 and the memory control unit 15 or via the memory control unit 15 alone. The memory 32 stores image data obtained by the image capturing unit 22 and converted into digital data by the A/D converter 23 or image data to be displayed on the display unit 28. The memory 32 has a storage capacity enough to store a movie and voice of a predetermined time.

The memory 32 also serves as a memory (video memory) for image display. A D/A converter 13 converts data for image display, which is stored in the memory 32, into an analog signal and supplies it to the display unit 28. The image data for display written in the memory 32 is thus displayed by the display unit 28 via the D/A converter 13. The display unit 28 performs display according to the analog signal from the D/A converter 13 on a display device such as an LCD. The A/D converter 23 temporarily converts an analog signal into a digital signal and stores it in the memory 32. The digital signal is then converted into an analog signal by the D/A converter 13, sequentially transferred to the display unit 28, and displayed. The display unit 28 thus functions as an electronic viewfinder and performs live view display.

A nonvolatile memory 56 is an electrically erasable/recordable memory. For example, an EEPROM or the like is used. The nonvolatile memory 56 stores constants and programs for the operation of the system control unit 50. The programs here indicate programs to be used to execute various kinds of flowcharts to be described later in this embodiment.

The system control unit 50 controls the entire digital video camera 100. The system control unit 50 executes the programs recorded in the above-described nonvolatile memory 56, thereby implementing each processing according to this embodiment to be described later. As a system memory 52, a RAM is used. The constants and variables for the operation of the system control unit 50, the programs read out from the nonvolatile memory 56, and the like are extracted on the system memory 52. The system control unit 50 controls the memory 32, the D/A converter 13, the display unit 28, and the like, thereby performing display control as well.

A system timer 53 serves as a timer unit that measures time to be used for various kinds of control or time of an internal clock. The mode changeover switch 60, a recording switch 61, and the operation unit 70 serve as operation means for inputting various kinds of operation instructions to the system control unit 50.

The mode changeover switch 60 switches the operation mode of the system control unit 50 to a movie recording mode, a reproduction mode, or the like. Examples of the modes included in the movie recording mode are an auto image capturing mode, auto scene discrimination mode, manual mode, various kinds of scene modes for defining image capturing settings for each image capturing scene, programed AE mode, and custom mode. The mode changeover switch 60 is used to directly switch the mode to one of these modes included in the movie capturing mode. Alternatively, the mode may temporarily be switched to the movie capturing mode by the mode changeover switch 60 and then switched to one of these modes included in the movie capturing mode using another operation member. The recording switch 61 switches between an image capturing standby state and an image capturing state. Based on the recording switch 61, the system control unit 50 starts a series of operations from signal read from the image capturing unit 22 until movie data write in the recording medium 200.

The respective operation members of the operation unit 70 are appropriately allocated functions for each scene by, for example, selectively operating various function icons displayed on the display unit 28, and act as various kinds of function buttons. Examples of the function buttons are an end button, a return button, an image feed button, a jump button, a narrow-down button, and an attribute change button. For example, when a menu button is pressed, a menu screen capable of doing various kinds of settings is displayed on the display unit 28. The user can intuitively do various kinds of settings using the menu screen displayed on the display unit 28, the 4-way selector in the four, vertical and horizontal directions, and a set button.

A power supply control unit 80 is formed from a battery detection circuit, a DC/DC converter, a switch circuit for switching a block to be energized, and the like, and detects the presence/absence of battery attachment, the type of battery, and the battery level. The power supply control unit 80 also controls the DC/DC converter based on the detection result and an instruction from the system control unit 50, and supplies a necessary voltage to the units including the recording medium 200 for a necessary period.

A power supply unit 30 is formed from a primary battery such as an alkali battery or a lithium battery; a secondary battery such as a NiCd battery, an NIMH battery, or an Li ion battery; an AC adapter, or the like. A recording medium interface 18 is an interface to the recording medium 200 such as a memory card or a hard disk. The recording medium 200 is a recording medium such as a memory card for recording a captured image, and is formed from a semiconductor memory, a magnetic disk, or the like.

The operation of this embodiment will be described below with reference to FIGS. 3 to 5.

In this embodiment, an example will be explained in which when a maximum photometric value for target exposure exceeds a reference value, the exposure is corrected in accordance with the difference between the reference value and the maximum photometric value for the target exposure.

Figure 3:
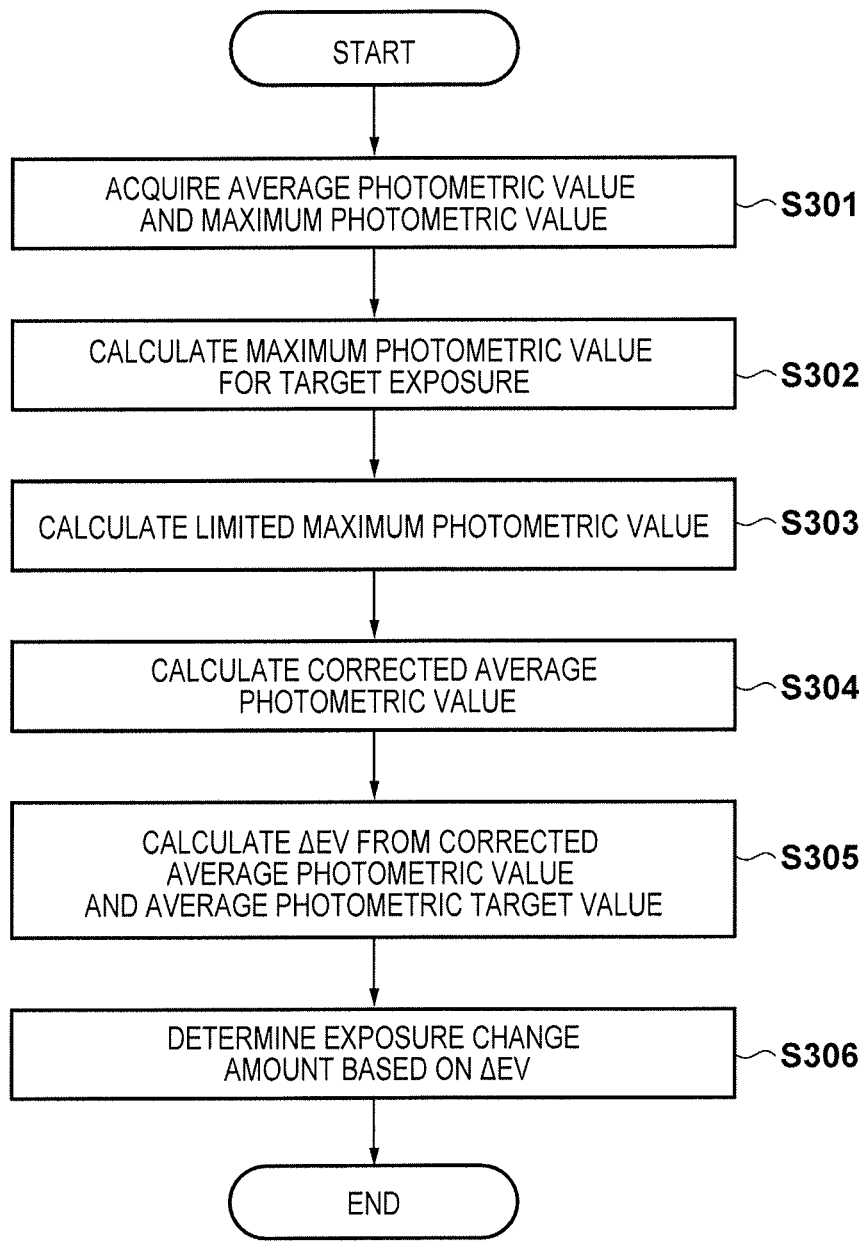
FIG. 3 is a flowchart of exposure change amount calculation processing.

FIG. 3 is a flowchart of exposure change amount calculation processing according to this embodiment. Each process of this flowchart is implemented by causing the system control unit 50 to extract and execute, on the system memory 52, a program stored in the nonvolatile memory 56.

First, an average photometric value (first photometric value) and a maximum photometric value (second photometric value) are acquired (step S301). FIG. 4 shows an example of a photometric value acquisition area according to this embodiment. In this embodiment, image data is divided into 8×8=64 areas, and the photometric value of each area is acquired. For example, if image data has 1920×1080 pixels, 64 average luminance values of the 240×135 pixels are acquired. All photometric values are averaged to obtain the average photometric value. Unlike the average photometric value, the largest value (the value of the high luminance area) out of the 64 average photometric values is obtained as the maximum photometric value.

A maximum photometric value (third photometric value) for target exposure, which is a maximum photometric value supposedly obtained when the average photometric value has reached the average photometric target value, is calculated by maximum photometric value for target exposure=
(maximum photometric value×average photometric target value)/average photometric value      (1)

(step S302).

The average photometric target value is a predetermined value. The system control unit 50 changes exposure such that the average photometric value comes close to the average photometric target value. That is, the average photometric target value equals the average photometric value when target exposure is obtained for the average luminance of the image data.

A limited maximum photometric value that places a limitation (lower limit value) on the maximum photometric value for target exposure is calculated by when maximum photometric value for target
   exposure<maximum photometric reference
   value, limited maximum photometric
   value=maximum photometric reference value when maximum photometric reference
   value<maximum photometric value for target
   exposure limited maximum photometric
   value=maximum photometric value for target
   exposure      (2)

(step S303).

Next, a corrected average photometric value is calculated by corrected average photometric value=(average photometric value×limited maximum photometric value)/maximum photometric reference value      (3)

(step S304).

If the maximum photometric value for target exposure is smaller than the maximum photometric reference value, the limited maximum photometric value equals the maximum photometric reference value. In this case, the corrected average photometric value equals the average photometric value from equation (3). That is, when the maximum photometric value is relatively small, and the high luminance area is not too bright, exposure correction based on the maximum photometric value is not performed. On the other hand, when the maximum photometric value for target exposure is larger than the maximum photometric reference value, the high luminance area is too bright, and exposure correction is necessary. In this case, the corrected average photometric value is larger than the average photometric value. When the corrected average photometric value is made larger than the average photometric value by changing the exposure so that the corrected average photometric value equals the average photometric target value, the exposure becomes dark. It is therefore possible to suppress the high luminance area from becoming too bright.

Next, an absolute value ΔEV of the difference value (difference amount) between the corrected average photometric value and the average photometric target value is calculated by ΔEV=|log$_2$(corrected average photometric value/average photometric target value)|      (4)

(step S305).

If calculation is difficult, ΔEV may be obtained from a table prepared in advance in accordance with a value obtained by dividing the corrected average photometric value by the average photometric target value.

Next, the exposure change amount is obtained using ΔEV (step S306). FIG. 5 is a graph showing the relationship between the exposure change amount and ΔEV for exposure change amount calculation according to this embodiment. The exposure change amount is determined based on FIG. 5. The exposure change amount is ½ ΔEV. The exposure change amount is calculated for every field. The exposure is changed by the calculated exposure change amount for every field and thus made to come close to the target exposure. That is, the exposure change amount represents the amount of exposure to change in one field.

For example, assume that the average photometric target value is A, the maximum photometric reference value is 2A, the average photometric value is 2A, and the maximum photometric value is 8A. In this case, the maximum photometric value for target exposure is 4A, ΔEV is 2EV, and the exposure change amount is 1EV.

Assume that the signal is not saturated, and the object does not change. When the exposure is changed by 1EV, the average photometric value is A, and the maximum photometric value is 4A. At this time, the maximum photometric value for target exposure remains 4A, ΔEV is 1EV, and the exposure change amount is ½EV.

When the exposure is changed by ½EV, the average photometric value is A/√2, and the maximum photometric value is 2√2·A. The maximum photometric value for target exposure remains 4A, ΔEV is ½EV, and the exposure change amount is ¼EV.

The exposure change amount is determined in the above-described way. The maximum photometric value for target exposure is predicted from the average photometric value, the average photometric target value, and the maximum photometric value. For this reason, if neither a saturated signal nor a change in the object exists, the maximum photometric value for target exposure remains unchanged even when the exposure is changed. That is, the exposure correction amount does not vary. When correcting the exposure, the exposure can be changed by the same exposure change amount as in the absence of exposure correction.

In this embodiment, an example in which the average photometric value is used in exposure control has been described. However, the present invention is not limited to this method. A value obtained by dividing the screen into a plurality of areas and weighting and averaging the photometric values may be used. This also applies to the maximum photometric value. The maximum photometric value need only be the photometric value concerning the high luminance area. This value may be obtained either by averaging the photometric values of several frames having high average values or by averaging the photometric values of a specific number of pixels in descending order of luminance value.

The ΔEV calculation method is not limited, either. In this embodiment, the average photometric value is corrected by equation (3) and compared with the average photometric target value. The same calculation can be done even by correcting the average photometric target value. The same calculation can also be done even by calculating ΔEV from the average photometric target value and the average photometric value and then correcting ΔEV. It is only necessary to reflect the correction amount obtained from the limited maximum photometric value and the maximum photometric reference value on ΔEV.

Second Embodiment

In the first embodiment, an example has been described in which the exposure is corrected such that the maximum photometric value for target exposure equals the maximum photometric reference value. In this method, however, if an object having an extremely high luminance is included, the difference between the reference value and the maximum photometric value for target exposure becomes large. Hence, the exposure is excessively corrected low. In the second embodiment, a method of further limiting the exposure correction amount in the first embodiment will be described.

The procedure of exposure change amount calculation is the same as in the first embodiment. In the second embodiment, the limited maximum photometric value calculation method of the first embodiment is changed.

In steps S301 and S302, the same processes as in the first embodiment are performed to calculate the maximum photometric value for target exposure. When calculating the limited maximum photometric value in step S303, a maximum photometric upper limit value is set as the upper limit value of the maximum photometric value and calculated by when maximum photometric value for target
   exposure<maximum photometric reference
   value, limited maximum photometric
   value=maximum photometric reference value when maximum photometric reference
   value<maximum photometric value for target
   exposure<maximum photometric upper limit
   value limited maximum photometric
   value=maximum photometric value for target
   exposure when maximum photometric upper limit
   value<maximum photometric value for target
   exposure limited maximum photometric
   value=maximum photometric upper limit value     (5)

After the limited maximum photometric value is calculated, the processes of steps S304 to S306 are performed as in the first embodiment, thereby calculating the exposure change amount.

When the upper limit value is provided for the limited maximum photometric value, as indicated by equations (5), the limited maximum photometric value never becomes equal to or larger than the maximum photometric upper limit value. For this reason, the upper limit of the corrected average photometric value is set at a value obtained by multiplying the average photometric value by the maximum photometric upper limit value and dividing the product by the maximum photometric target value. For example, if the maximum photometric upper limit value is twice the maximum photometric reference value, the upper limit of the corrected average photometric value is set at twice the average photometric value, and the exposure is corrected to be lower by 1EV. That is, however high the luminance of an object included in the screen is, the exposure is never excessively corrected and is suppressed from becoming too low.

As in the first embodiment, if neither a saturated signal nor a change in the object exists, the maximum photometric value for target exposure changes little even when the exposure is changed. For this reason, when the exposure change amount is determined by the above-described method, it is possible to suppress the exposure from becoming too low while suppressing a high luminance area from becoming too bright and thus perform excellent exposure.

The present invention has been described above in detail based on its preferred embodiments. However, the present invention is not limited to these specific embodiments, and also incorporates various forms without departing from the spirit and scope of the present invention. Parts of the above-described embodiments may appropriately be combined.

For example, in the above-described two embodiments, an example has been described in which the exposure is corrected low based on a photometric value concerning a high luminance area. However, the present invention is also applicable to a case in which the exposure is corrected high based on a photometric value concerning a low luminance area.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-185766, filed Aug. 24, 2012, which is hereby incorporated by reference herein in its entirety.

What is claimed is:

1. An image capture apparatus comprising:
   an image sensor that captures an object image and outputs image data;

a photometric value acquisition processor that acquires, from the image data, a first photometric value which is an average photometric value and a second photometric value which is a maximum photometric value different from the first photometric value; and an exposure change processor that changes exposure such that the first photometric value comes close to an average photometric target value which is a predetermined value, wherein said exposure change processor calculates a third photometric value that is a maximum photometric value for target exposure, which is different from the first photometric value and the second photometric value, based on the first photometric value, the average photometric target value, and the second photometric value, and corrects the exposure in accordance with a difference between the third photometric value and a maximum photometric reference value.

2. The apparatus according to claim 1, wherein said exposure change processor corrects the exposure by correcting a difference between the first photometric value and the average photometric target value in accordance with the difference between the third photometric value and the maximum photometric reference value.

3. The apparatus according to claim 2, wherein said exposure change processor corrects the difference between the first photometric value and the average photometric target value by correcting the first photometric value in accordance with the difference between the third photometric value and the maximum photometric reference value.

4. The apparatus according to claim 2, wherein said exposure change processor corrects the difference between the first photometric value and the average photometric target value by correcting the average photometric target value in accordance with the difference between the third photometric value and the maximum photometric reference value.

5. The apparatus according to claim 1, wherein said exposure change processor increases a correction amount of the exposure as the difference between the third photometric value and the maximum photometric reference value becomes large.

6. The apparatus according to claim 1, wherein when the third photometric value is larger than an upper limit value, said exposure change processor corrects the exposure in accordance with a difference between the upper limit value and the maximum photometric reference value.

7. The apparatus according to claim 1, wherein said exposure change processor corrects the exposure low when the third photometric value is larger than the maximum photometric reference value, and does not correct the exposure when the third photometric value is not larger than the maximum photometric reference value.

8. The apparatus according to claim 1, wherein said exposure change processor determines an exposure change amount representing an amount of exposure to be changed in one field based on a difference between the first photometric value and the average photometric target value.

9. The apparatus according to claim 8, wherein said exposure change processor determines the exposure change amount representing the amount of exposure to be changed in one field based on the difference between the first photometric value and the average photometric target value, on which the correction based on the difference between the third photometric value and the maximum photometric reference value is reflected.

10. The apparatus according to claim 1, wherein the third photometric value is a value obtained by multiplying a ratio of the average photometric target value to the first photometric value by the second photometric value.

11. The apparatus according to claim 1, wherein the second photometric value is a photometric value concerning a high luminance area.

12. A method of controlling an image capture apparatus including an image sensor that captures an object image and outputs image data, comprising:

a photometric value acquisition step of acquiring, from the image data, a first photometric value which is an average photometric value and a second photometric value which is a maximum photometric value different from the first photometric value; and an exposure change step of changing exposure such that the first photometric value comes close to an average photometric target value which is a predetermined value, wherein in exposure change step, a third photometric value that is a maximum photometric value for target exposure, which is different from the first photometric value and the second photometric value is calculated based on the first photometric value, the average photometric target value, and the second photometric value, the exposure is corrected in accordance with a difference between the third photometric value and a maximum photometric reference value.

* * * * *